(12) United States Patent
Gaul

(10) Patent No.: US 7,219,753 B2
(45) Date of Patent: May 22, 2007

(54) TOOL HOLDER FOR ANNULAR CORE BIT

(75) Inventor: Hans-Dieter Gaul, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 265 days.

(21) Appl. No.: 10/723,743

(22) Filed: Nov. 26, 2003

(65) Prior Publication Data

US 2004/0154837 A1    Aug. 12, 2004

(30) Foreign Application Priority Data

Nov. 30, 2002    (DE) ............... 102 56 050

(51) Int. Cl.
    *E21B 10/62*    (2006.01)
(52) U.S. Cl. ........... 175/403; 408/239 R; 408/141
(58) Field of Classification Search .......... 175/20, 175/244, 403; 125/5; 408/138, 239 R, 141, 408/142
    See application file for complete search history.

(56) References Cited

U.S. PATENT DOCUMENTS

| 1,172,139 | A | * | 2/1916 | Jenkins ................. 175/403 |
| 2,324,225 | A | | 7/1943 | Muller et al. |
| 2,929,612 | A | * | 3/1960 | Le Bus, Sr. ............ 175/244 |
| 3,647,310 | A | * | 3/1972 | Morse ................. 408/239 R |
| 3,715,168 | A | * | 2/1973 | Kuhn ................... 408/204 |
| 3,876,319 | A | * | 4/1975 | Meyer ................. 403/343 |
| 4,209,272 | A | * | 6/1980 | Miyanaga ............. 408/1 R |
| 4,303,357 | A | * | 12/1981 | Makar ................. 408/204 |
| 4,860,838 | A | * | 8/1989 | Asak .................. 175/320 |
| 5,163,523 | A | * | 11/1992 | Yousef et al. ......... 175/320 |
| 5,352,071 | A | * | 10/1994 | Cochran et al. ....... 408/204 |
| 5,598,751 | A | | 2/1997 | Ochayon |
| 5,655,613 | A | * | 8/1997 | Lauermann et al. ..... 175/403 |
| 6,092,964 | A | * | 7/2000 | El Dessouky et al. ... 408/1 R |
| 6,341,925 | B1 | * | 1/2002 | Despres .............. 408/204 |
| 6,371,221 | B1 | * | 4/2002 | Harrigan et al. ....... 175/26 |
| 6,588,993 | B2 | * | 7/2003 | Omi ................... 408/226 |
| 6,887,018 | B2 | * | 5/2005 | Ostermeier ........... 408/204 |
| 2001/0001276 | A1 | | 5/2001 | Chao |
| 2004/0018063 | A1 | * | 1/2004 | Ostermeier ........... 408/204 |
| 2005/0161263 | A1 | * | 7/2005 | Takano et al. ......... 175/403 |

FOREIGN PATENT DOCUMENTS

| DE | 0102516 | 9/2001 |
| WO | 9715413 | 5/1997 |

\* cited by examiner

*Primary Examiner*—David Bagnell
*Assistant Examiner*—Daniel P Stephenson
(74) *Attorney, Agent, or Firm*—Abelman, Frayne & Schwab

(57) ABSTRACT

A tool holder (1) for an annular core bit has a bit-side axial stop surface (4) and an end-side axial splined profile (3) extending in a bit direction. The tool holder has an outer thread (5) forming radial spline projections of the splined profile (3) that cooperates with the inner profile (12) of the core bit.

11 Claims, 1 Drawing Sheet

TOOL HOLDER FOR ANNULAR CORE BIT

BACKGROUND OF THE INVENTION

1. Field of the Invention

The present invention relates to a tool holder for a drilling tool and, in particular, for an annular core bit.

2. Description of the Prior Art

Tool holder for conventional annular core bits with an inner thread, e.g., 1¼" UNC or PIXIE, has a bit-side axial stop surface for axially supporting the core bit. A drawback of such releasable thread connections, e.g., according to U.S. Pat. No. 4,911,253, consists in laborious mounting of the core bit on the tool holder and its dismounting therefrom. Also, often, jamming of the thread connection occurs.

German Publication DE-37 44 091 discloses a tool holder for an annular core bit which permits quick mounting and dismounting of the core bit. The tool holder has an outer splined profile and two outer conical surfaces, and an inner splined profile and two inner conical surfaces.

German Publication DE-38 14 365 A1 discloses a tool holder for quick mounting and dismounting of an annular core bit having a special hollow flange with an outer thread. The tool holder is provided with a power tool-side (further tool-side) bayonet-type through-grooves, with an end-side cylindrical guide flange with radially projecting entraining pins, and with a bit-side axially spaced, outer thread axially supporting the bit via a sleeve having an inner thread cooperating with the outer thread, and bit-side axial stop surfaces.

German Publication DE-199 63 636 discloses a tool holder for quick mounting and dismounting of an annular core bit. The core bit has an end side inner splined profile and an axially spaced, hollow flange with an inner cone and an outer thread. The tool holder has an end-side outer cone, a splined profile provided on its tool side, and an axially offset outer thread which cooperates with an inner thread of a sleeve. For mounting the core bit, the splined profile of the bit holder engages in the inner splined profile of the hollow flange having an inner core and an outer thread.

An object of the present invention is a tool holder for quick mounting and dismounting of an annular core bit and adapted for use with both an annular core bit having a complementary splined profile and an annular core bit having an inner thread.

SUMMARY OF THE INVENTION

This and other objects of the present invention, which will become apparent hereinafter, are achieved by providing a tool holder having a bit-side axial stop surface and an end-side cylindrical splined profile having an outer thread forming radial spline projections of the splined profile.

With the formation of the splined profile by the outer thread, the tool holder can be used for both mounting a conventional core bit with an inner thread and for quick mounting and dismounting of an annular core bit having a complementary splined profile.

Advantageously, at least one of an outer thread dimension and a dimension of inner grooves of the splined profile defines a radial guide dimension that extends over an axial guide length which is larger than the radial guide dimension. This permits to axially guide the annular core bit.

Advantageously, the splined profile is provided with circumferentially equidistantly spaced, axial grooves having, preferably, the same circumferential width. This insures a symmetrical torsional loading of the splined profile.

Advantageously, the splined profile is formed with at least three, preferably, six axial grooves. This provides for uniform distribution of high tangential forces acting on the radial spline projections.

Advantageously, the tool holder has a tool-side axial stop surface axially spaced from the bit-side axial stop surface and a sleeve having an inner thread and provided on a tool side of the tool holder. The sleeve overlaps the power tool-side axial stop surface in a spaced relationship thereto. This provides for transmission of a tensional load between the tool holder and the associated thread of the annular core bit.

Advantageously, the tool holder has a conical surface extending from the bit-side stop surface in the tool direction. This conical surface cooperates with a corresponding inner conical surface of the core bit, providing for centering of the core bit.

Advantageously, this conical surface is limited by the bit-side and tool-side axial stop surfaces, whereby an axially short conical annular flange is formed.

The tool holder and the annular core bit, which has a complementary inner splined profile, form together a quick mounting and dismounting assembly, permitting to provide a standardized tool holder-annular core bit system. In such a system, a high connection quality and a high rigidity of the system is achieved.

Advantageously, a rubber ring is provided between the tool-side axial stop surface and the sleeve with an inner thread. Provision of the rubber ring prevents inadvertent loosening of the sleeve as a result of vibrations.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figures 1, 2:
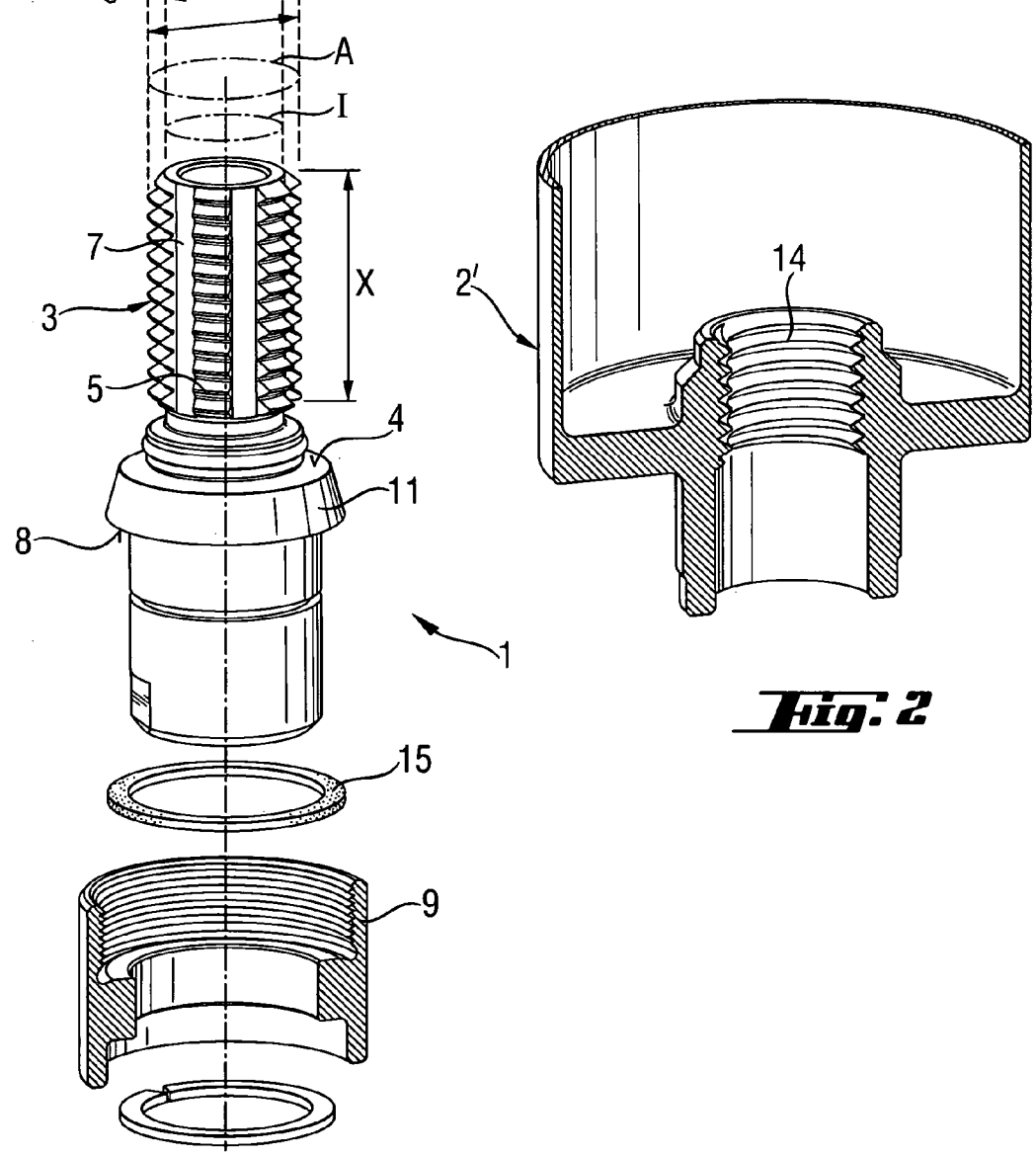
FIG. 1 an exploded perspective, partially cross-sectional view of a tool holder according to the present invention for an annular core bit before mounting of the core bit.
FIG. 2 a cross-sectional view of another embodiment of an annular core bit for use with the inventive tool holder.

A tool holder 1 according to the present invention, which is shown in FIG. 1 and which is designed for mounting an annular core bit 2, has an end side cylindrical splined profile 3 and a bit-side axial stop surface 4. The outer splined profile 3 has an outer thread 5, e.g., a 1¼" UNC thread, which forms radial spline projections of the splined profile 3. The outer thread dimension A and the dimension I of the inner grooves of the splined profile 3 define radial guide dimensions which extend over an axial guide length X that is greater than the radial guide dimension defined by the outer thread dimension A. The splined profile 3 is formed with six equidistantly circumferentially spaced axial grooves 7 having the same circumferential width. The tool holder 1 also has a machine-tool-side or power tool-side, further simply tool-side, axial stop surface 8 axially spaced from the bit-side axial stop surface 4. On a tool-side of the tool holder 1, there is provided, a sleeve 9 having an inner thread. The sleeve 9 surrounds the tool-side axial stop surface 8 in the region of the inner thread in a spaced relationship thereto. The inner thread of the sleeve 9 cooperates with an outer thread 10 of the annular core bit 2 for securing the bit 2 on the tool holder 1. The tool holder 1 has an outer conical surface 11 extending axially from the bit-side stop surface 4 in the tool direction. The conical surface 11 is limited by the tool-side stop surface 8 and the bit-side axial stop surface 4.

The tool holder 1 according to the present invention insures quick mounting and dismounting of the annular core bit 2 which is provided with an inner splined profile 12 complementary to the outer splined profile 3 of he tool holder 1.

The chuck further includes a rubber ring 15 arranged between the sleeve 9 and the machine-side axial stop surface 8.

An annular core bit 2' shown in FIG. 2, which has an inner thread 14 corresponding to the outer thread 5 of the splined profile 3, i.e., a 1¼" UNC, in case the outer thread 5 is 1¼" UNC thread, can also be used with the inventive tool holder.

Though the present invention was shown and described with references to the preferred embodiments such are merely illustrative of the present invention and are not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A tool holder (1) for an annular core bit (2, 2'), comprising a bit-side axial stop-surface (4); and an end-side outer profile (3) extending away from the stop-surface in a bit direction and cooperating with an inner profile of the core bit, the end-side outer profile (3) being formed as a splined profile and having an outer thread (5) forming radial spline projections of the splined profile (3).

2. A tool holder according to claim 1, wherein at least one of an outer thread dimension (A) and a dimension (I) of grooves of the splined profile (3) defines a radial guide dimension that extends over an axial guide length (X) which is larger than the radial guide dimension.

3. A tool holder according to claim 1, wherein the splined profile (3) has a plurality of equidistantly circumferentially spaced, axial grooves (7).

4. A tool holder according to claim 3, wherein the axial grooves (7) have a same circumferential width.

5. A tool holder according to claim 3, wherein the splined profile has at least three axial grooves (7).

6. A tool holder according to claim 5, wherein the splined profile has six axial grooves (7).

7. A tool holder according to claim 1, further comprising a tool-side axial stop surface (8) axially spaced from the bit-side axial stop surface (4), and a sleeve (9) having an inner thread and provided on a tool-side of the tool holder, the sleeve (9) overlapping the tool-side stop surface (8) in a spaced relationship thereto.

8. A tool holder according to claim 7, further comprising a rubber ring (15) provided between the sleeve (9) and the tool-side axial stop surface (8).

9. A tool holder according to claim 1, further comprising an axial conical surface (11) extending from the bit-side axial stop surface (4) in a tool direction.

10. A tool holder according to claim 9, wherein the conical surface (11) is axially limited by the bit-side axial stop surface (4), and a tool-side axial stop surface (8).

11. A tool assembly for core drilling, comprising an annular core bit (2); and a tool holder (1) for the annular core bit (2, 2'), wherein the tool holder comprises a bit-side axial stop surface (4), and an end-side outer profile (3) extending away from the stop surface cooperating with an inner profile of the annular core bit, the end-side outer profile (3) being formed as a splined profile and in a bit direction and having an outer thread (5) forming radial spline projections of the splined profile (3), the annular core bit inner profile (12) being complementary to the end-side outer of the tool holder.

* * * * *